(12) United States Patent
Hafuka

(10) Patent No.: US 12,555,903 B2
(45) Date of Patent: Feb. 17, 2026

(54) RECEIVING DEVICE

(71) Applicant: LAPIS Technology Co., Ltd., Yokohama (JP)

(72) Inventor: Takamitsu Hafuka, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 80 days.

(21) Appl. No.: 18/677,801

(22) Filed: May 29, 2024

(65) Prior Publication Data

US 2024/0405422 A1    Dec. 5, 2024

(30) Foreign Application Priority Data

Jun. 1, 2023 (JP) .................... 2023-090771
Mar. 28, 2024 (JP) .................... 2024-053817

(51) Int. Cl.
*H01Q 3/24* (2006.01)
*H04B 1/48* (2006.01)
*H04B 17/19* (2015.01)
*H04B 17/318* (2015.01)

(52) U.S. Cl.
CPC .......... *H01Q 3/24* (2013.01); *H04B 17/318* (2015.01)

(58) Field of Classification Search
CPC ........... H01Q 1/38; H01Q 1/50; H01Q 19/17; H01Q 1/36; H01Q 21/0025; H01Q 1/48; H01Q 3/2605; H01Q 1/246; H01Q 3/2658; H01Q 1/3233; H01Q 21/065
See application file for complete search history.

(56) References Cited

U.S. PATENT DOCUMENTS

| | | | | |
|---|---|---|---|---|
| 10,211,970 B2* | 2/2019 | Kamgaing | ............ | H04B 10/548 |
| 10,257,012 B2* | 4/2019 | Ma | ............ | H04L 27/2663 |
| 2004/0037378 A1* | 2/2004 | Komori | ............ | H03G 3/3078 |
| | | | | 375/345 |
| 2005/0185737 A1* | 8/2005 | Yamauchi | ............ | H04B 17/318 |
| | | | | 375/316 |
| 2006/0189279 A1* | 8/2006 | Kobayashi | ............ | H04W 52/42 |
| | | | | 455/101 |

(Continued)

FOREIGN PATENT DOCUMENTS

JP    2000059277    2/2000

*Primary Examiner* — Wei (Victor) Y Chan
(74) *Attorney, Agent, or Firm* — JCIPRNET

(57) ABSTRACT

A receiving device includes: first and second antennas; an antenna switching part switching a receiving antenna to the first or second antenna; a frequency conversion part obtaining a baseband signal; a frequency detection part obtaining a frequency detection signal; a data reproduction part generating demodulated data; a synchronization detection part performing synchronization detection based on the demodulated data; a signal strength acquisition part acquiring the signal strength of the received signal; and a switching controller controlling switching based on the signal strength. The switching controller controls the antenna switching part to switch at intervals of a first predetermined time before synchronization detection, maintains a synchronization detection state and switches the receiving antenna when reception with one antenna and synchronization detection are performed, and fixes the receiving antenna based on a comparison result of the signal strengths received by the first and second antennas after a second predetermined time has elapsed.

10 Claims, 14 Drawing Sheets

(56) References Cited

U.S. PATENT DOCUMENTS

2011/0268037 A1* 11/2011 Fujimoto ............. H04B 7/0851
                                                                370/328
2012/0190396 A1*  7/2012 Oyama ................ H04W 16/28
                                                                455/517

* cited by examiner

RECEIVING DEVICE

CROSS-REFERENCE TO RELATED APPLICATION

This application claims the priority benefits of Japanese application no. 2023-090771, filed on Jun. 1, 2023, and Japanese application no. 2024-053817, filed on Mar. 28, 2024. The entirety of the above-mentioned patent applications is hereby incorporated by reference herein and made a part of this specification.

BACKGROUND

Technical Field

The disclosure relates to a receiving device, and particularly relates to a receiving device that performs diversity reception.

Description of Related Art

Diversity receiving technology is used as a means for achieving high quality transmission in mobile communications. Antenna diversity, which is one of the diversity receiving techniques, is adopted when diversity reception is applied to a communication system that uses frequency shift keying (FSK).

In antenna diversity, the preamble portion of a data packet, which includes a preamble and a data body portion, is received by multiple antennas to acquire the received signal strength (RSSI: received signal strength indicator), and the data body portion is received by the antenna where high received signal strength is acquired (for example, Patent Document 1 (Japanese Patent Application Laid-Open No. 2000-59277)).

In an antenna diversity receiver, antennas are switched at predetermined time intervals to search for a signal wave that is desired to be received (hereinafter referred to as a desired wave). Then, the desired wave is input to the antenna, and the RSSI value is held at the timing when synchronization detection is performed. For example, in an antenna diversity receiver that has a first antenna and a second antenna, when the second antenna is used to receive the desired wave for the first time, the RSSI value is held after synchronization detection is performed. After clearing (initializing) the synchronization state, the receiving antenna is switched to the first antenna, and the desired wave is received by the first antenna. When synchronization detection is performed based on the desired wave input to the first antenna, or when a predetermined time has elapsed without synchronization detection, the acquired RSSI value is held as the RSSI value of the first antenna. The RSSI value of the first antenna and the RSSI value acquired by the second antenna are compared with each other, and the antenna with the greater RSSI value is determined as the antenna that receives the subsequent data. Thereafter, the synchronization state is initialized, and synchronization detection is performed again with the finally determined antenna to receive the data portion.

Thus, in the conventional antenna diversity receiver, antenna switching is performed for each synchronization detection. Therefore, it takes the time corresponding to the number of antennas multiplied by the synchronization detection time to determine the antenna for receiving the data portion. In addition, since the synchronization state is initialized when switching to the final antenna, the time for performing synchronization detection one more time is necessary before the synchronization state is established again.

Since antenna diversity reception is assumed to be performed in the preamble portion of a data packet, if the time required to determine the antenna becomes longer, a correspondingly longer preamble is required. This causes a problem that the time for transmitting data and the time for receiving data become longer. In addition, as it takes a long time to transmit and receive data, there is also a problem that the power consumption increases.

The disclosure provides a receiving device that is capable of shortening the time for data reception using a diversity antenna and reducing power consumption.

SUMMARY

The receiving device according to the disclosure is a receiving device configured to receive a radio transmission wave modulating a data packet, which includes a preamble and a data body portion. The receiving device includes: a first antenna and a second antenna; an antenna switching part selectively switching a receiving antenna used to receive the radio transmission wave to either one of the first antenna and the second antenna; a frequency conversion part performing frequency conversion on a received signal obtained by receiving the radio transmission wave by the first antenna or the second antenna to obtain a baseband signal; a frequency detection part performing frequency detection on the baseband signal to obtain a frequency detection signal; an offset removal part removing a DC offset from the frequency detection signal; a data reproduction part performing data determination based on the frequency detection signal with the DC offset removed, and generating demodulated data; a synchronization detection part performing synchronization detection by correlating the demodulated data with data of a predetermined preamble pattern; a signal strength acquisition part acquiring a signal strength of the received signal based on the baseband signal; and a switching controller controlling switching of the receiving antenna performed by the antenna switching part based on the signal strength of the received signal. The switching controller controls the antenna switching part to switch the receiving antenna at intervals of a first predetermined time before synchronization detection is performed by the synchronization detection part, supplies a state holding signal to the synchronization detection part to maintain a synchronization detection state, and controls the antenna switching part to switch the receiving antenna to the other antenna in a case where the radio transmission wave is received by one of the first antenna and the second antenna and synchronization detection is performed by the synchronization detection part, and controls the antenna switching part to fix the receiving antenna to either one of the first antenna and the second antenna based on a comparison result obtained by comparing a first signal strength with a second signal strength after a second predetermined time has elapsed since the antenna switching part performs switching to the other antenna, in which the first signal strength is a signal strength when the received signal is received by the first antenna, and the second signal strength is a signal strength when the received signal is received by the second antenna.

DESCRIPTION OF THE EMBODIMENTS

Figure 1:
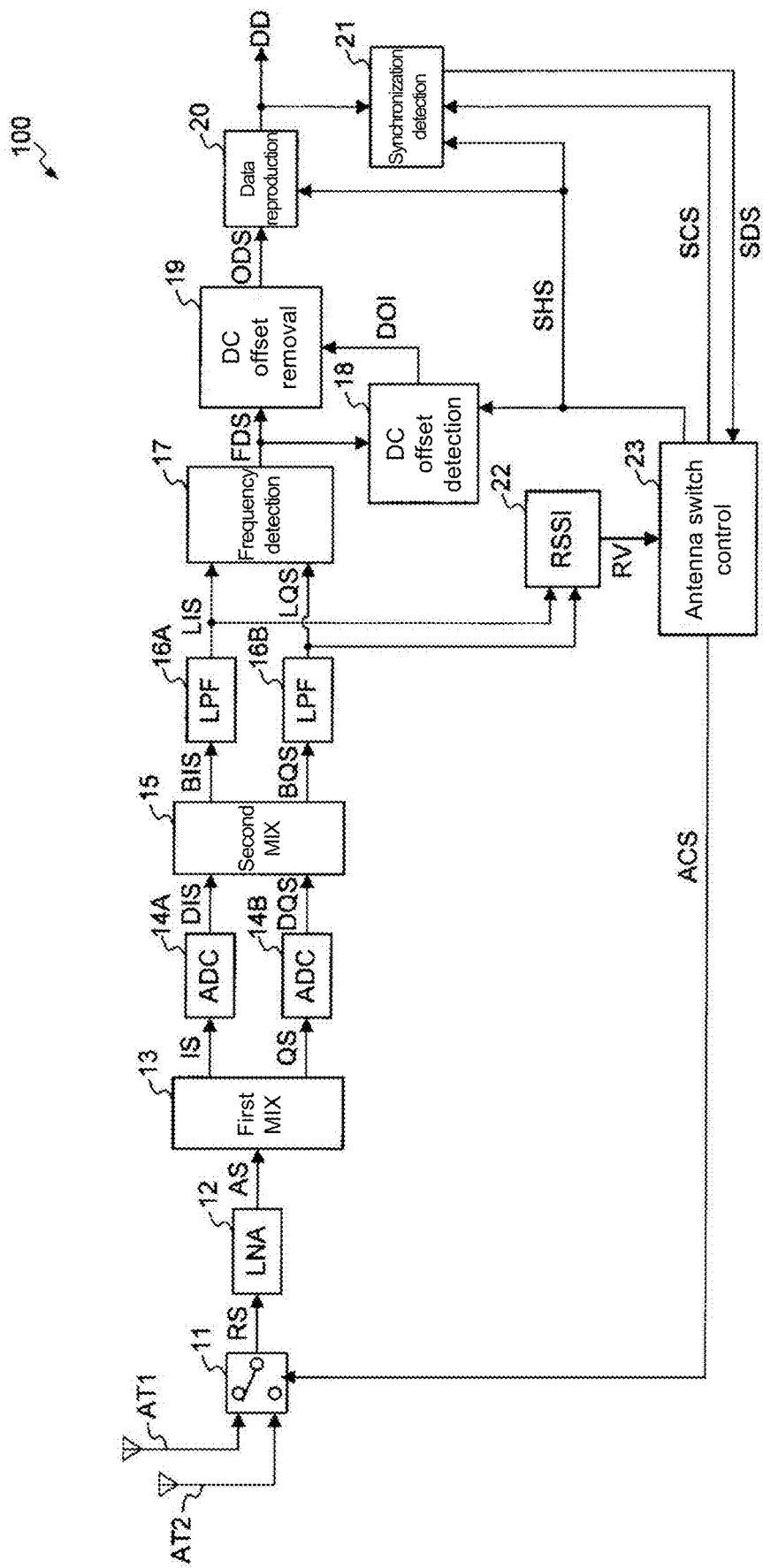
FIG. 1 is a block diagram showing the configuration of the receiving device according to an embodiment of the disclosure.

According to the receiving device of the disclosure, it is possible to shorten the time for data reception using a diversity antenna and to reduce power consumption.

Hereinafter, embodiments of the disclosure will be described with reference to the drawings. In the following description of each embodiment and the accompanying drawings, the same reference numerals are assigned to substantially the same or equivalent parts.

FIG. 1 is a block diagram showing the configuration of a receiving device 100 according to an embodiment of the disclosure. The receiving device 100 is a receiving device that receives a radio modulated wave obtained by modulating a data packet that includes a preamble and a data body portion following the preamble. In this embodiment, the radio modulated wave is modulated by an FSK (Frequency Shift Keying) modulation method, and is transmitted from a transmitting device (not shown) to the receiving device 100.

The receiving device 100 includes an antenna AT1, an antenna AT2, an antenna switch 11, an LNA (Low Noise Amplifier) circuit 12, a first MIX circuit 13, an ADC (Analog-to-Digital Converter) 14A, an ADC 14B, a second MIX circuit 15, an LPF (Low Pass Filter) 16A, an LPF 16B, a frequency detection circuit 17, a DC offset detection circuit 18, a DC offset removal circuit 19, a data reproduction circuit 20, a synchronization detection circuit 21, an RSSI (Received Signal Strength Indicator) detection circuit 22, and an antenna switch control circuit 23.

The antenna AT1 is a first antenna provided for receiving the radio modulated wave transmitted from the transmitting device. The antenna AT2 is a second antenna provided for receiving the radio modulated wave transmitted from the transmitting device. The antenna AT1 and the antenna AT2 are arranged at a predetermined interval.

The antenna switch 11 is provided between the antennas AT1 and AT2 and the LNA circuit 12. The antenna switch 11 receives an antenna control signal ACS, and in response thereto, switches the connection destination so that either one of the antennas AT1 and AT2 is connected to the LNA circuit 12. The radio modulated wave received by the antenna AT1 or the antenna AT2 is input to the antenna switch 11 as a received signal RS, and is supplied to the LNA circuit 12 via the antenna switch 11.

The LNA circuit 12 is a low noise amplifier that amplifies, with low noise, the received signal RS that is received by the antenna AT1 or AT2 and supplied via the antenna switch 11. The LNA circuit 12 amplifies the received signal RS to generate an amplified signal AS, and supplies the amplified signal AS to the first MIX circuit 13.

The first MIX circuit 13 is a mixer that mixes the amplified signal AS supplied from the LNA circuit 12 with a local oscillation signal from a local oscillator (not shown). The first MIX circuit 13 frequency-converts the amplified signal AS to an IF (Inter Mediate) frequency (intermediate frequency), and generates an I-phase (In-phase) IF signal IS and a Q-phase (Quadrature) IF signal QS whose phases differ by 90 degrees.

The ADCs 14A and 14B are AD converters provided in the subsequent stage of the first MIX circuit 13. The ADC 14A performs analog-to-digital conversion on the I-phase IF signal IS generated by the first MIX circuit 13, and generates a digital IF signal DIS (I-phase). The ADC 14B performs analog-to-digital conversion on the Q-phase IF signal QS generated by the first MIX circuit 13, and generates a digital IF signal DQS (Q-phase).

The second MIX circuit 15 is a mixer that mixes the digital IF signal DIS (I-phase) and the digital IF signal DQS (Q-phase) generated by the ADCs 14A and 14B with a local oscillation signal from a local oscillator (not shown). The second MIX circuit 15 frequency-converts the digital IF signal DIS (I-phase) and the digital IF signal DQS (Q-phase), and generates baseband signals BIS (I-phase) and BQS (Q-phase).

The LPFs 16A and 16B are low pass filters that extract only signal components of a desired frequency channel by limiting the passband at a predetermined cutoff frequency. The LPF 16A passes frequency components (low-frequency components) that are equal to or lower than the cutoff frequency of the I-phase baseband signal BIS output from the second MIX circuit 15, and outputs an I-phase low-frequency baseband signal LIS. The LPF 16B passes frequency components (low-frequency components) that are equal to or lower than the cutoff frequency of the Q-phase baseband signal BQS output from the second MIX circuit 15, and outputs a Q-phase low-frequency baseband signal LQS.

The frequency detection circuit 17 is a detection circuit that detects a frequency modulated signal that has been FSK modulated. The frequency detection circuit 17 converts the frequency changes contained in the low-frequency baseband signals LIS (I-phase) and LQS (Q-phase) into amplitude changes, and generates a frequency detection signal FDS.

The DC offset detection circuit 18 is a detection circuit that detects a DC offset by performing processing such as inflection point detection on the frequency detection signal FDS. The DC offset detection circuit 18 extracts inflection point information from the frequency detection signal FDS by inflection point detection, and generates DC offset information DOI by averaging the inflection point information.

The DC offset removal circuit 19 removes the DC offset from the frequency detection signal FDS based on the DC offset information DOI generated by the DC offset detection circuit 18. The frequency detection signal FDS with the DC offset removed is supplied to the data reproduction circuit 20 as a frequency detection signal ODS from which the DC offset has been removed.

The data reproduction circuit 20 extracts a symbol timing value from the frequency detection signal ODS from which the DC offset has been removed, and generates demodulated data DD by performing data determination at that symbol timing.

The synchronization detection circuit 21 is a circuit that performs synchronization detection by preamble detection or the like. The synchronization detection circuit 21 performs synchronization detection based on the demodulated data DD generated by the data reproduction circuit 20, and generates a synchronization detection signal SDS. The synchronization detection signal SDS is supplied to the antenna switch control circuit 23.

The RSSI detection circuit 22 receives input of the low-frequency baseband signals LIS (I-phase) and LQS (Q-phase), which are baseband signals that have been passband-limited by the LPFs 16A and 16B, and based on these, calculates the RSSI value (power detection value) RV of the received signal RS.

Figure 2:
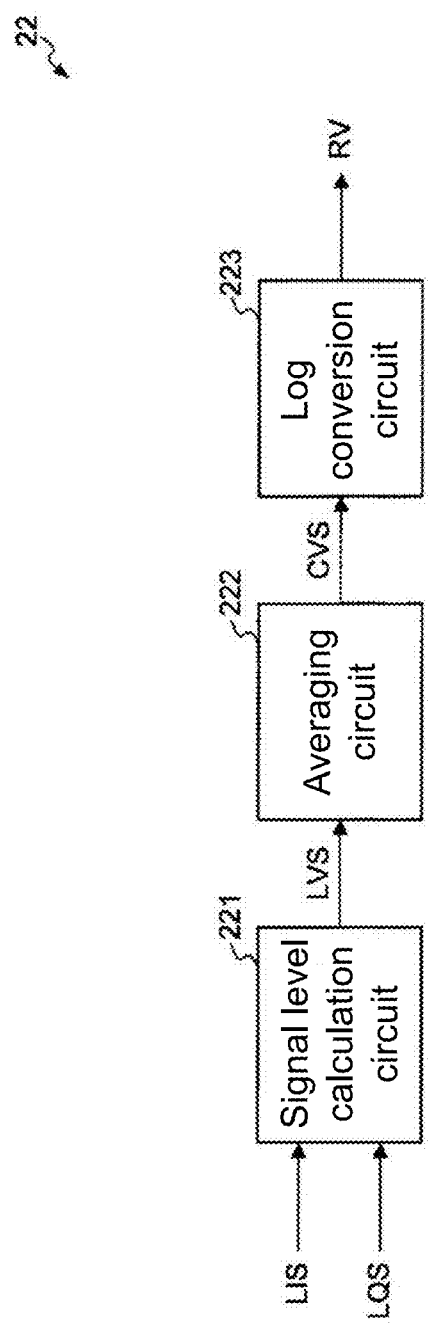
FIG. 2 is a block diagram showing the configuration of the RSSI detection circuit.

FIG. 2 is a block diagram showing the configuration of the RSSI detection circuit 22. The RSSI detection circuit 22 includes a signal level calculation circuit 221, an averaging circuit 222, and a log conversion circuit 223.

The signal level calculation circuit 221 calculates the magnitude (signal level) of the received signal RS based on the low-frequency baseband signals LIS (I-phase) and LQS (Q-phase). Specifically, the signal level calculation circuit 221 generates a level value signal LVS representing the magnitude of the received signal RS by calculating the square root of "$(LIS)^2+(LQS)^2$" which is the sum of the squares of the low-frequency baseband signals LIS (I-phase) and LQS (Q-phase).

The averaging circuit 222 is a circuit that receives input of the level value signal LVS, and averages the same. The averaging circuit 222 is provided to suppress fluctuations in the RSSI value due to noise. The averaging circuit 222 supplies the averaged level value signal LVS to the log conversion circuit 223 as a convergence level value signal CVS.

The log conversion circuit 223 calculates the RSSI value RV by logarithmically converting the convergence level value signal CVS.

Figure 3:
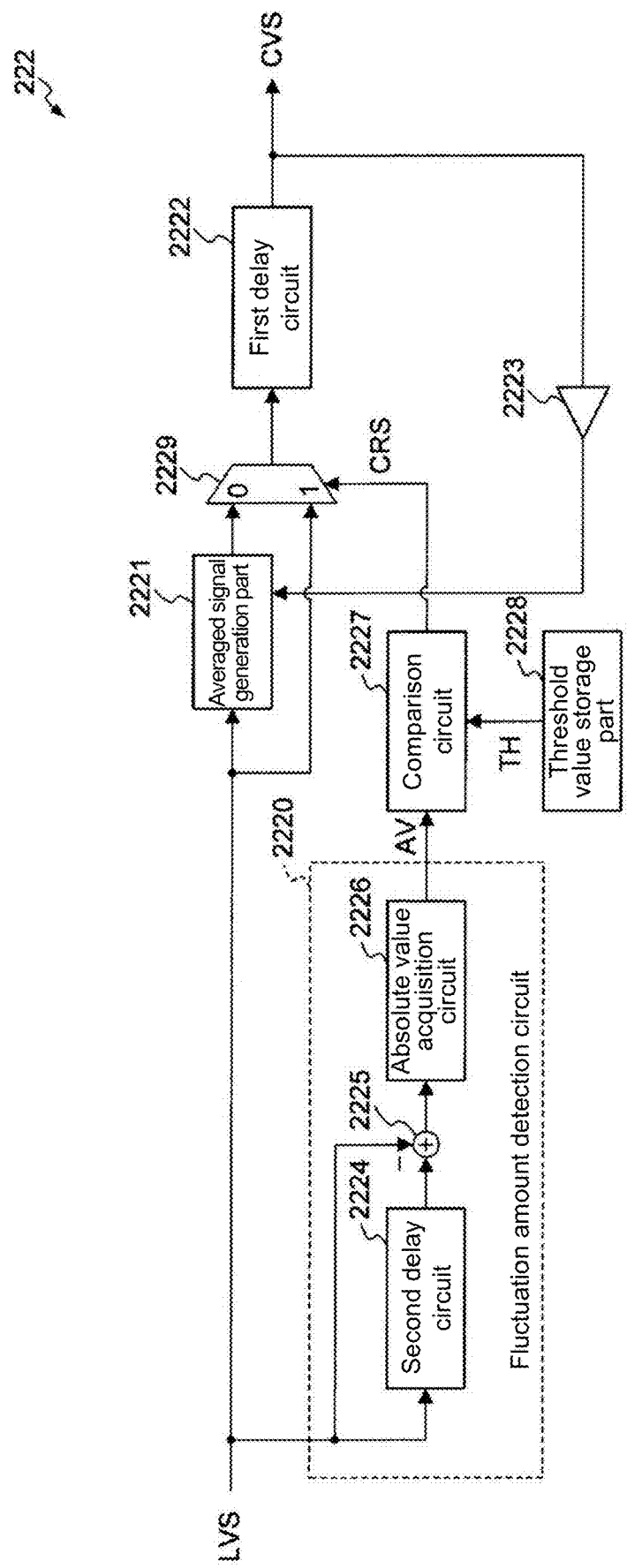
FIG. 3 is a block diagram showing the configuration of the averaging circuit.

FIG. 3 is a block diagram showing the configuration of the averaging circuit 222. The averaging circuit 222 includes a fluctuation amount detection circuit 2220, an averaged signal generation part 2221, a first delay circuit 2222, a buffer 2223, a comparison circuit 2227, a threshold value storage part 2228, and a selector 2229.

The fluctuation amount detection circuit 2220 is a circuit that calculates a fluctuation amount of the level value signal LVS, which is an input signal, in a predetermined period. The fluctuation amount detection circuit 2220 is configured by a second delay circuit 2224, an adder 2225, and an absolute value acquisition circuit 2226.

The second delay circuit 2224 delays the level value signal LVS by a predetermined period, and outputs the same. The adder 2225 outputs a result of adding the level value signal LVS, which is an input signal, a delayed level value signal obtained by delaying the level value signal LVS by the second delay circuit 2224, and a signal obtained by multiplying the level value signal LVS, which is an input signal, by a coefficient of "−1", that is, a signal corresponding to the difference between the delayed level value signal and the input signal. The absolute value acquisition circuit 2226 acquires the absolute value of the output of the adder 2225, and supplies the same to the comparison circuit 2227 as a fluctuation amount AV.

The threshold value storage part 2228 stores a predetermined threshold value TH for fluctuation amount comparison. The threshold value TH read out from the threshold value storage part 2 228 is supplied to the comparison circuit 2227.

The comparison circuit 2227 compares the fluctuation amount AV output from the fluctuation amount detection circuit 2220 with the threshold value TH, and outputs a comparison result signal CRS indicating the comparison result. The comparison result signal CRS is a signal whose signal level changes to "1" (logic level 1) in the case where the fluctuation amount AV is equal to or greater than the threshold value TH, and changes to "0" (logic level 0) in the case where the fluctuation amount AV is less than the threshold value TH.

The first delay circuit 2222 delays the output signal of the selector 2229, and outputs the same as a convergence level value signal CVS. The convergence level value signal CVS is output from the averaging circuit 222 and supplied to the log conversion circuit 223, and is fed back via the buffer 2223 and supplied to the averaged signal generation part 2221.

The averaged signal generation part 2221 generates a signal obtained by averaging the level value signal LVS based on the level value signal LVS and the output signal (CVS) of the first delay circuit 2222 fed back via the buffer 2223. The averaged signal generation part 2221 is configured by, for example, an adder, and generates the signal obtained by averaging the level value signal LVS based on the difference between a signal obtained by multiplying the output signal from the buffer 2223 by a negative coefficient and the level value signal LVS, which is an input signal.

The level value signal LVS, which is an input signal, is input directly to the "1" side input terminal of the selector 2229. On the other hand, the signal obtained by averaging the level value signal LVS, which is generated by the averaged signal generation part 2221, is input to the "0" side input terminal of the selector 2229.

As described above, in the case where the fluctuation amount AV is equal to or greater than the threshold value TH, the signal level of the comparison result signal CRS becomes "1" as described above, so the level value signal LVS itself is output from the selector 2229 and supplied to the first delay circuit 2222. On the other hand, in the case where the fluctuation amount AV is less than the threshold value TH, the signal level of the comparison result signal CRS becomes "0" as described above, so the output signal of the averaged signal generation part 2221 is output from the selector 2229 and supplied to the first delay circuit 2222.

With this configuration, in the averaging circuit 222 of this embodiment, in the case where the fluctuation amount of the input signal (level value signal LVS) is small (less than the threshold value), the output signal (convergence level value signal CVS) is fed back to average the signal, whereas in the case where the fluctuation amount of the input signal (level value signal LVS) is large (equal to or greater than the threshold value), a signal obtained by delaying the input signal itself is output as the convergence level value signal CVS.

With reference to FIG. 1 again, the antenna switch control circuit 23 is a circuit that performs switching control of the antenna switch 11 by supplying the antenna control signal ACS to the antenna switch 11. The antenna switch control circuit 23 generates the antenna control signal ACS based on the synchronization detection signal SDS supplied from the synchronization detection circuit 21 and the RSSI value RV supplied from the RSSI detection circuit 22. Furthermore, the antenna switch control circuit 23 generates a synchronization clear signal SCS, which is a signal for canceling the synchronization detection state of the synchronization detection circuit 21, and supplies the same to the synchronization detection circuit 21.

Figure 4:
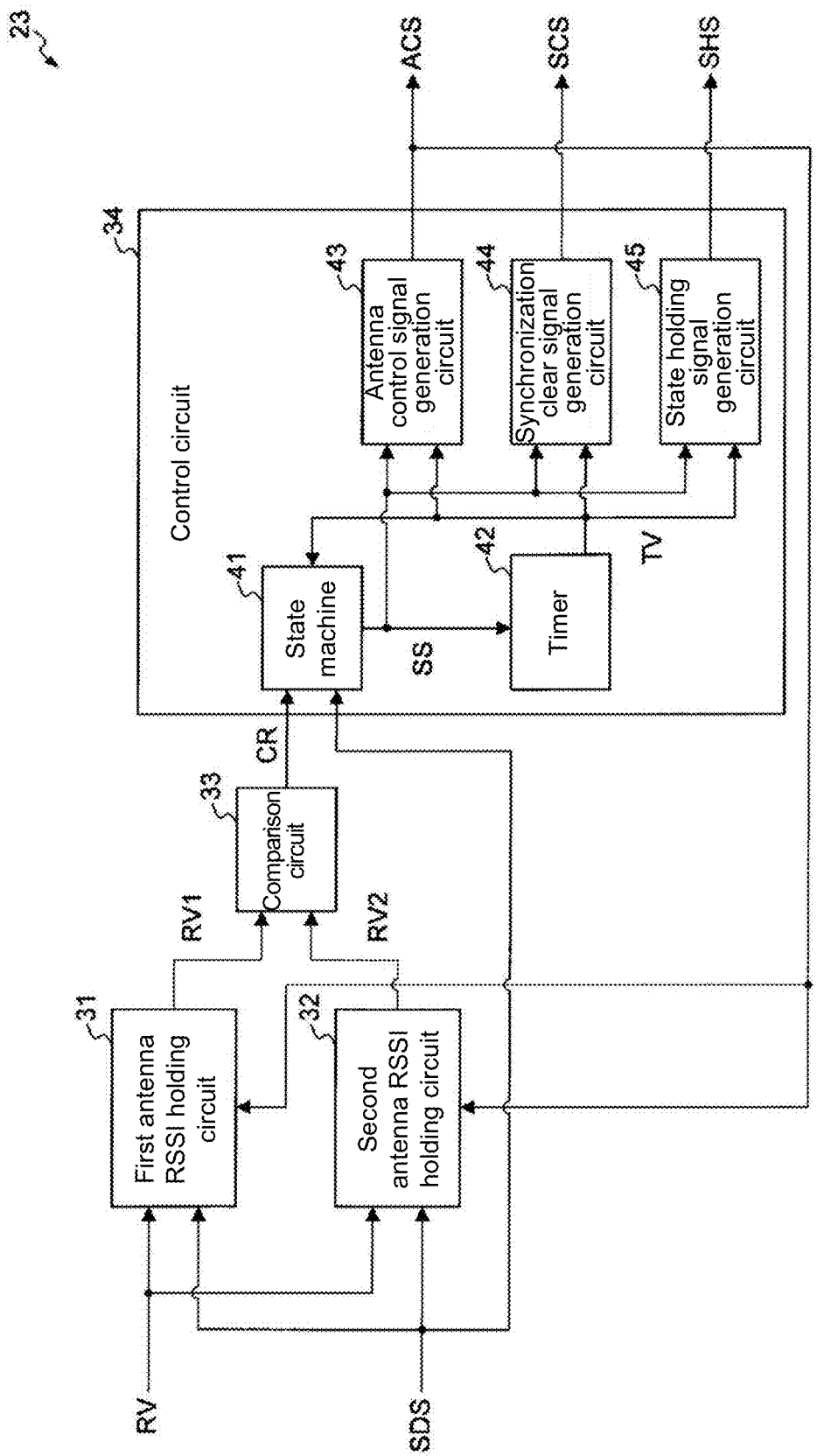
FIG. 4 is a block diagram showing the configuration of the antenna switch control circuit.

FIG. 4 is a block diagram showing the configuration of the antenna switch control circuit 23. The antenna switch control circuit 23 includes a first antenna RSSI holding circuit 31, a second antenna RSSI holding circuit 32, a comparison circuit 33, and a control circuit 34.

The first antenna RSSI holding circuit 31 and the second antenna RSSI holding circuit 32 are circuits that respectively receive supply of the antenna control signal ACS and the synchronization detection signal SDS, and hold the RSSI value RV based on these signals. The first antenna RSSI holding circuit 31 holds the RSSI value RV supplied from the RSSI detection circuit 22 in the case where the antenna AT1, which is the first antenna, is selected as the receiving antenna based on the antenna control signal ACS and the signal level of the synchronization detection signal SDS is H level (logic level 1). The second antenna RSSI holding circuit 32 holds the RSSI value RV supplied from the RSSI detection circuit 22 in the case where the antenna AT2, which is the second antenna, is selected as the receiving antenna based on the antenna control signal ACS and the signal level of the synchronization detection signal SDS is H level (logic level 1).

The comparison circuit 33 compares the RSSI value RV1, which is the RSSI value held by the first antenna RSSI holding circuit 31, and the RSSI value RV2, which is the RSSI value held by the second antenna RSSI holding circuit 32, in magnitude and outputs the comparison result CR.

The control circuit 34 includes a state machine 41, a timer 42, an antenna control signal generation circuit 43, a synchronization clear signal generation circuit 44, and a state holding signal generation circuit 45.

The state machine 41 receives supply of the synchronization detection signal SDS and the comparison result CR, and performs state transition for antenna control based on these. The state machine 41 generates a state signal SS indicating the current state, and supplies the same to the timer 42 and the antenna control signal generation circuit 43.

The timer 42 performs counting for measuring a predetermined time in response to the state signal SS supplied from the state machine 41. The timer 42 performs counting, for example, in response to the clock timing of a clock signal (not shown), and outputs a timer value TV indicating this when finishing counting a predetermined time. In this embodiment, the timer 42 counts a time T1 or a time T2 according to the signal level of the state signal SS.

The antenna control signal generation circuit 43 generates the antenna control signal ACS based on the state signal SS supplied from the state machine 41 and the timer value TV supplied from the timer 42.

The synchronization clear signal generation circuit 44 generates the synchronization clear signal SCS based on the state signal SS supplied from the state machine 41 and the timer value TV supplied from the timer 42.

Figure 5:
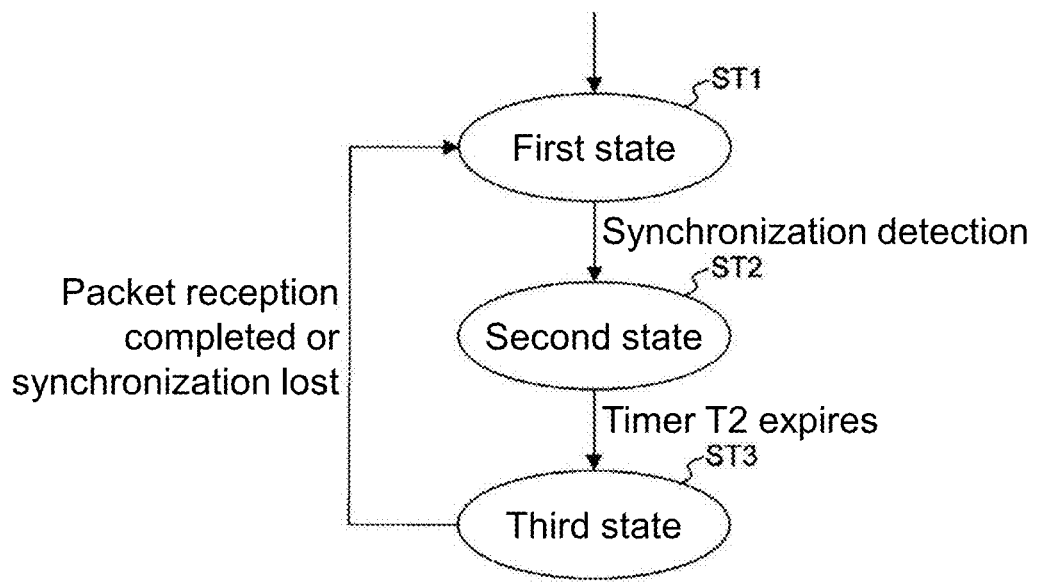
FIG. 5 is a state transition diagram of the state machine.

FIG. 5 is a diagram showing the state transition of the state machine 41. The state machine 41 has three states, and performs state transition according to conditions such as the signal level of the synchronization detection signal SDS, the timer value TV of the timer 42, and completion of reception of the radio modulated wave (received signal RS).

The first state ST1 is a state before synchronization detection. The state machine 41 supplies the state signal SS indicating the first state ST1 to the timer 42 and the antenna control signal generation circuit 43. In response to this, the timer 42 repeatedly performs counting to measure the time T1. The antenna control signal generation circuit 43 generates the antenna control signal ACS whose signal level repeatedly changes between H level (logic level 1) and L level (logic level 0) at intervals of the time T1, and supplies the same to the antenna switch 11.

When synchronization detection is performed by the synchronization detection circuit 21 and the synchronization detection signal SDS indicating that synchronization detection has been performed is supplied to the state machine 41, the state machine 41 transitions to the second state ST2.

The second state ST2 is a state after synchronization detection. The state machine 41 supplies the state signal SS indicating the second state ST2 to the timer 42 and the antenna control signal generation circuit 43. In response to this, the timer 42 performs counting to measure the time T2. The antenna control signal generation circuit 43 outputs the antenna control signal ACS having a signal level obtained by inverting the signal level of the antenna control signal ACS when synchronization detection has been performed.

When the time T2 measured by the timer 42 expires, the state machine 41 transitions to the third state ST3.

The third state ST3 is a state in which the search for an antenna with high signal strength has been completed. When receiving supply of the comparison result CR from the comparison circuit 33 indicating that one of the RSSI value RV1 and the RSSI value RV2 is greater than the other, in response to this, the state machine 41 supplies the state signal SS indicating that the antenna corresponding to the one RSSI value (that is, antenna TA1 when the RSSI value is RV1, and antenna TA2 when the RSSI value is RV2) should be selected to the antenna control signal generation circuit 43. The antenna control signal generation circuit 43 generates the antenna control signal ACS, which controls the antenna switch 11 to fix the receiving antenna to the antenna with the greater RSSI value, according to the state signal SS supplied from the state machine 41, and supplies the same to the antenna switch 11.

The state machine 41 transitions to the first state ST1 in the case where reception of the radio modulated wave (data packet) is completed or in the case where synchronization is lost during reception. The receiving device 100 searches for the desired wave again.

Figure 6:
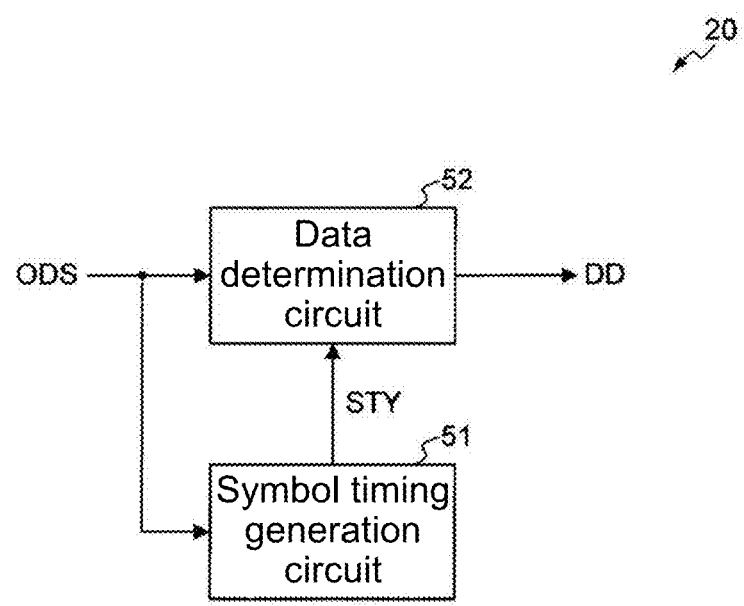
FIG. 6 is a block diagram showing the configuration of the data reproduction circuit.

FIG. 6 is a block diagram showing the configuration of the data reproduction circuit 20. The data reproduction circuit 20 includes a symbol timing generation circuit 51 and a data determination circuit 52.

The symbol timing generation circuit 51 generates a symbol timing SYT, which is the optimum timing for determining the data value of "1" and "0" of the digital data, from the frequency detection signal ODS from which the DC offset has been removed.

The data determination circuit 52 generates demodulated data DD indicating the result ("1" or "0") of performing data determination at the symbol timing SYT.

Figure 7:
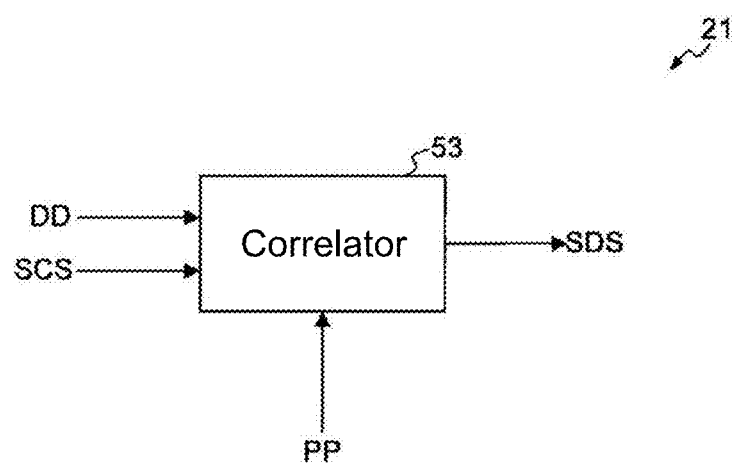
FIG. 7 is a block diagram showing the configuration of the synchronization detection circuit.

FIG. 7 is a block diagram showing the configuration of the synchronization detection circuit 21. The synchronization detection circuit 21 includes a correlator 53 which correlates the demodulated data DD with a predetermined preamble pattern PP. The synchronization detection circuit 21 outputs the synchronization detection signal SDS at H level (logic level 1) in the case where the correlation between the demodulated data DD and the preamble pattern PP reaches a correlation value equal to or greater than a certain threshold value.

Further, the synchronization detection circuit 21 has a function of clearing the synchronization state upon receiving the synchronization clear signal SCS. That is, the synchronization detection circuit 21 changes the signal level of the synchronization detection signal SDS to L level (logic level 0) in response to the synchronization clear signal SCS at H level (logic level 1). In the case where the state holding signal SHS at H level (logic level 1) is supplied, the synchronization detection circuit 21 operates to ignore the synchronization clear signal SCS. That is, in the case where the state holding signal SHS at H level is supplied to the synchronization detection circuit 21, the receiving device 100 maintains the synchronization state regardless of whether the synchronization clear signal SCS is supplied to the synchronization detection circuit 21.

Next, the operation of antenna diversity reception executed by the receiving device 100 of this embodiment will be described with reference to the time chart of FIG. 8.

First, the antenna switch control circuit 23A in the state before synchronization detection outputs the antenna control signal ACS whose signal level changes between H level and L level at every time T1. Thus, the receiving antenna is switched between the antennas AT1 and AT2 at every time T1, and a search for the desired wave is performed. Here, a case where the antenna AT1 is selected when the antenna control signal ACS is at H level and the antenna AT2 is selected when the antenna control signal ACS is at L level is illustrated as an example.

When synchronization detection is performed by the synchronization detection circuit 21 and the synchronization detection signal SDS becomes H level, the receiving device 100 determines that the desired wave including the preamble has been received, and holds the RSSI value RV detected by the RSSI detection circuit 22 at the synchronization detection timing in the first antenna RSSI holding circuit 31 or the second antenna RSSI holding circuit 32. FIG. 8 shows a case where the radio modulated wave of the portion corresponding to the preamble of the data packet is input to the antenna TA2 in a state where the antenna TA2 is selected by the antenna control signal ACS at H level, and synchronization detection is performed. The second antenna RSSI holding circuit 32 holds the RSSI value RV2 at the timing of synchronization detection. The state machine 41 transitions to the second state ST2.

The antenna switch control circuit 23 changes the signal level of the antenna control signal ACS, and causes the antenna switch 11 to switch the receiving antenna. Here, since synchronization detection is performed with the antenna TA2, switching to the antenna AT1 is performed.

The RSSI detection circuit 22 detects the RSSI value RV based on the received signal RS input to the antenna TA1. The first antenna RSSI holding circuit 31 holds the RSSI value RV detected by the RSSI detection circuit 22 as the RSSI value RV1.

The timer 42 performs counting to measure the time T2. When the time T2 expires, the state machine 41 transitions to the third state ST3.

The comparison circuit 33 compares the RSSI value RV2 held by the second antenna RSSI holding circuit 32 and the RSSI value RV1 held by the first antenna RSSI holding circuit 31 with each other, and outputs the comparison result CR. FIG. 8 shows a case where the RSSI value RV2 is greater than the RSSI value RV1 (in the drawing, these are "0x80" and "0x40", respectively).

Based on the comparison result CR, the antenna switch control circuit 23 determines the antenna with the greater RSSI value as the receiving antenna to be used for receiving data after the preamble, and holds the antenna control signal ACS (that is, holds the signal value).

Figure 8:
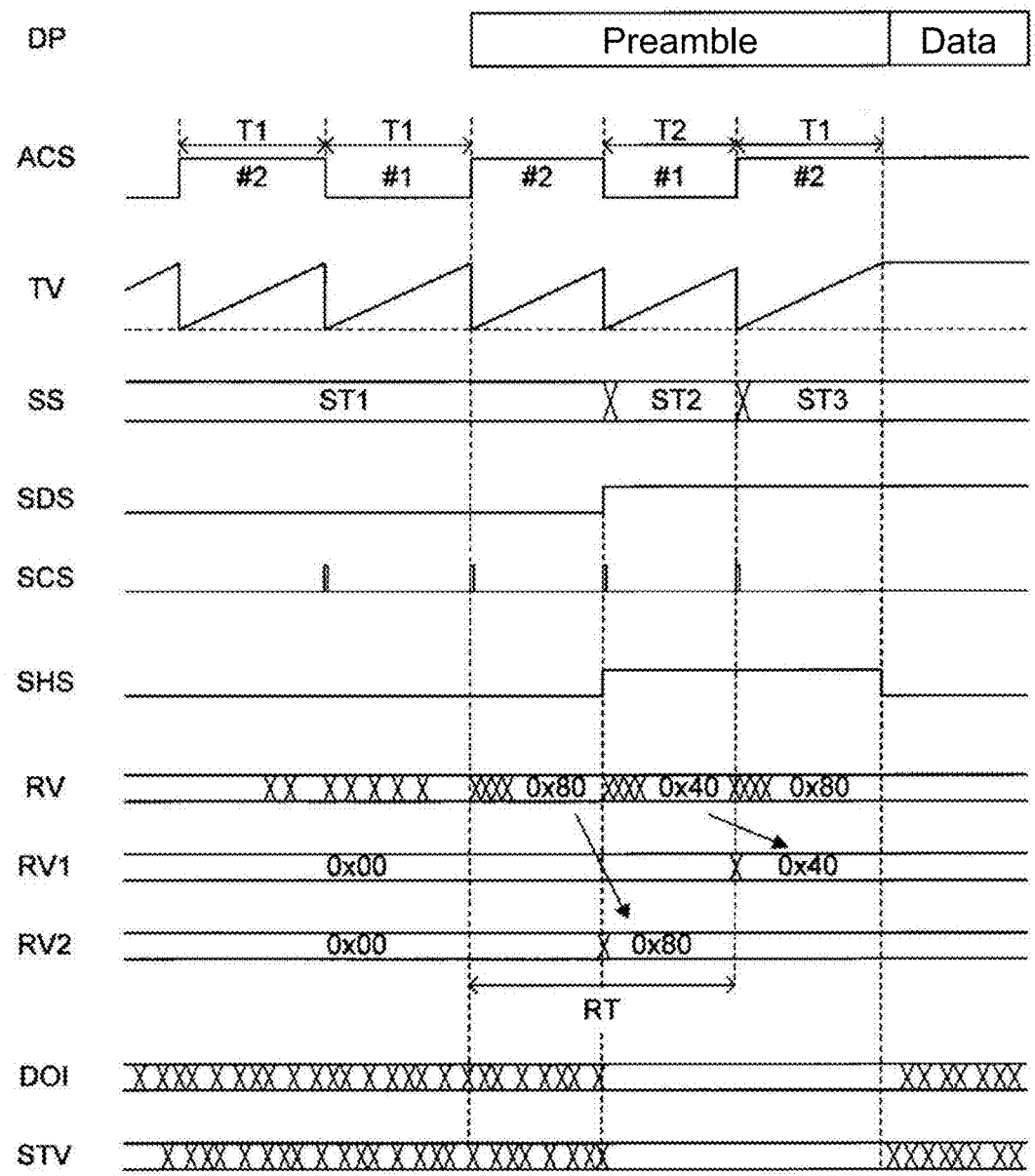
FIG. 8 is a time chart of the antenna diversity control.

In the example shown in FIG. 8, since the RSSI value RV2 is greater than the RSSI value RV1, the antenna TA2 is determined as the receiving antenna. Therefore, the antenna switch control circuit 23 changes the signal value of the antenna control signal ACS to control the antenna switch 11 to switch the receiving antenna to the antenna TA2, and then fixes the signal value of the antenna control signal ACS in order to maintain that state (that is, the state where the antenna TA2 is selected).

In the case where the RSSI value RV1 is greater than the RSSI value RV2, the antenna switch control circuit 23 determines the antenna TA1 as the receiving antenna, holds the antenna control signal ACS in the state where the antenna TA1 is selected, and maintains that state of the antenna switch 11.

The timer 42 performs counting to measure the time T1, and stops the time measurement operation when the time T1 expires. The state holding signal generation circuit 45 outputs the state holding signal SHS at H level (logic level 1) until the time T1 is measured by the timer 42, during a period in which the state machine 41 is in the first state ST1 and a period in which the state machine 41 is in the second state ST2.

During the period in which the state holding signal SHS is at H level, the DC offset detection circuit 18 holds the value of the symbol timing SYT when the synchronization detection signal SDS becomes H level. Furthermore, since the state holding signal SHS is at H level, the synchronization clear signal SCS is ignored, and the receiving device 100 continues the synchronization state (a state where synchronization detection has been performed).

In the case where reception of the radio modulated wave (data packet) is completed or in the case where synchronization is lost during reception, the state machine 41 transitions to the first state ST1. The receiving device 100 searches for the desired wave again.

Through the above-described routine, the receiving device 100 performs the operation of antenna diversity reception. After the initial synchronization detection for acquiring the RSSI value is performed, the receiving device 100 of this embodiment supplies the state holding signal SHS to the synchronization detection circuit 21, thereby maintaining the synchronization state. According to this configuration, it is not necessary to perform synchronization detection again after the state of the state machine 41 transitions from the second state ST2 to the third state ST3, so the time for reception of a data packet can be shortened.

Figure 9:
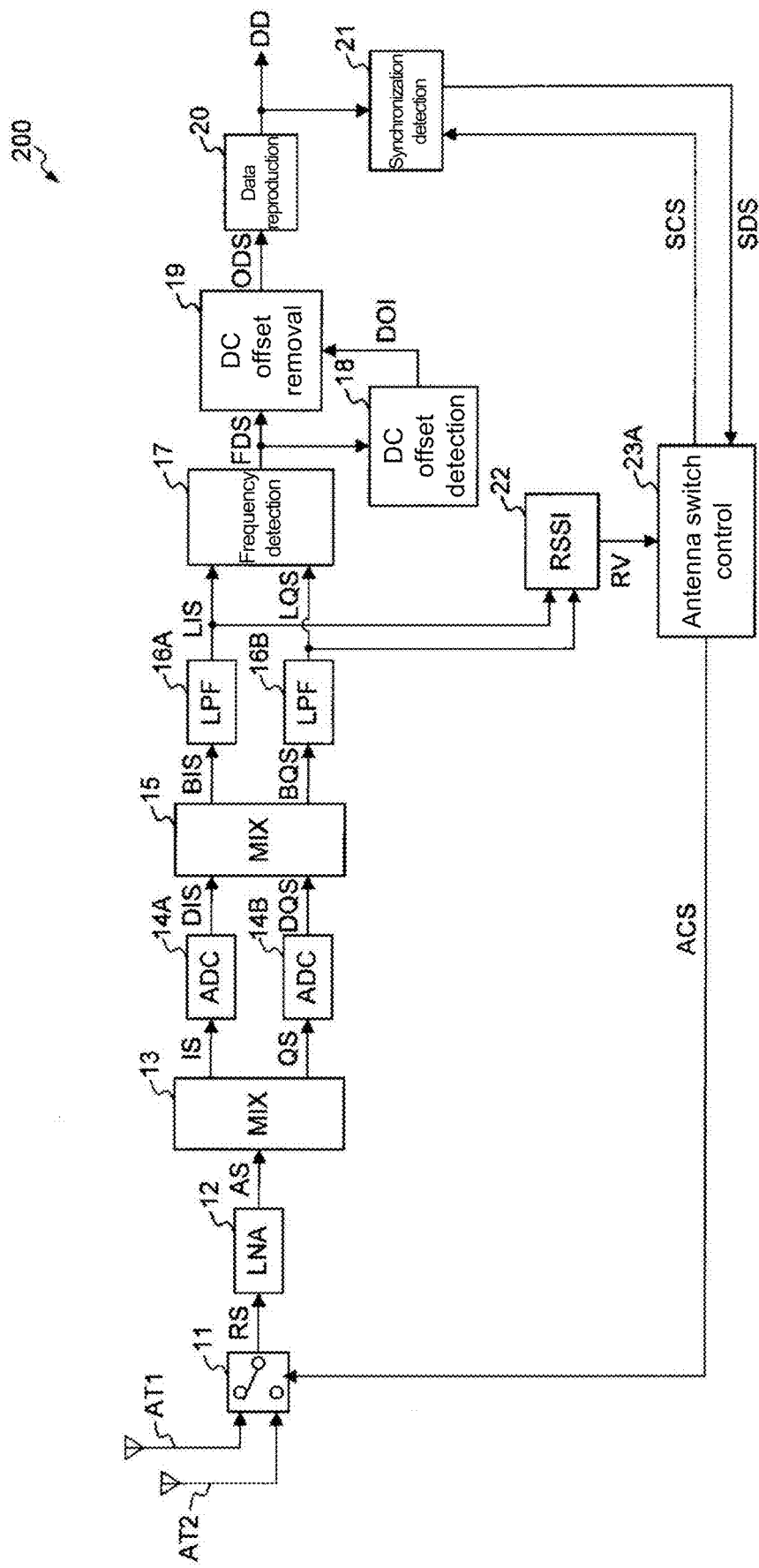
FIG. 9 is a block diagram showing the configuration of the receiving device of a comparative example.

FIG. 9 is a block diagram showing the configuration of a receiving device 200 of a comparative example which, unlike the receiving device 100 of this embodiment, does not maintain the synchronization state by the state holding signal.

In the receiving device 200 of the comparative example, unlike the receiving device 100 of this embodiment shown in FIG. 1, the antenna switch control circuit 23A does not output the state holding signal SHS. Therefore, the synchronization detection state detected by the synchronization detection circuit 21 in the stage of detecting the RSSI value RV is canceled in response to the supply of the synchronization clear signal SCS.

Figure 10:
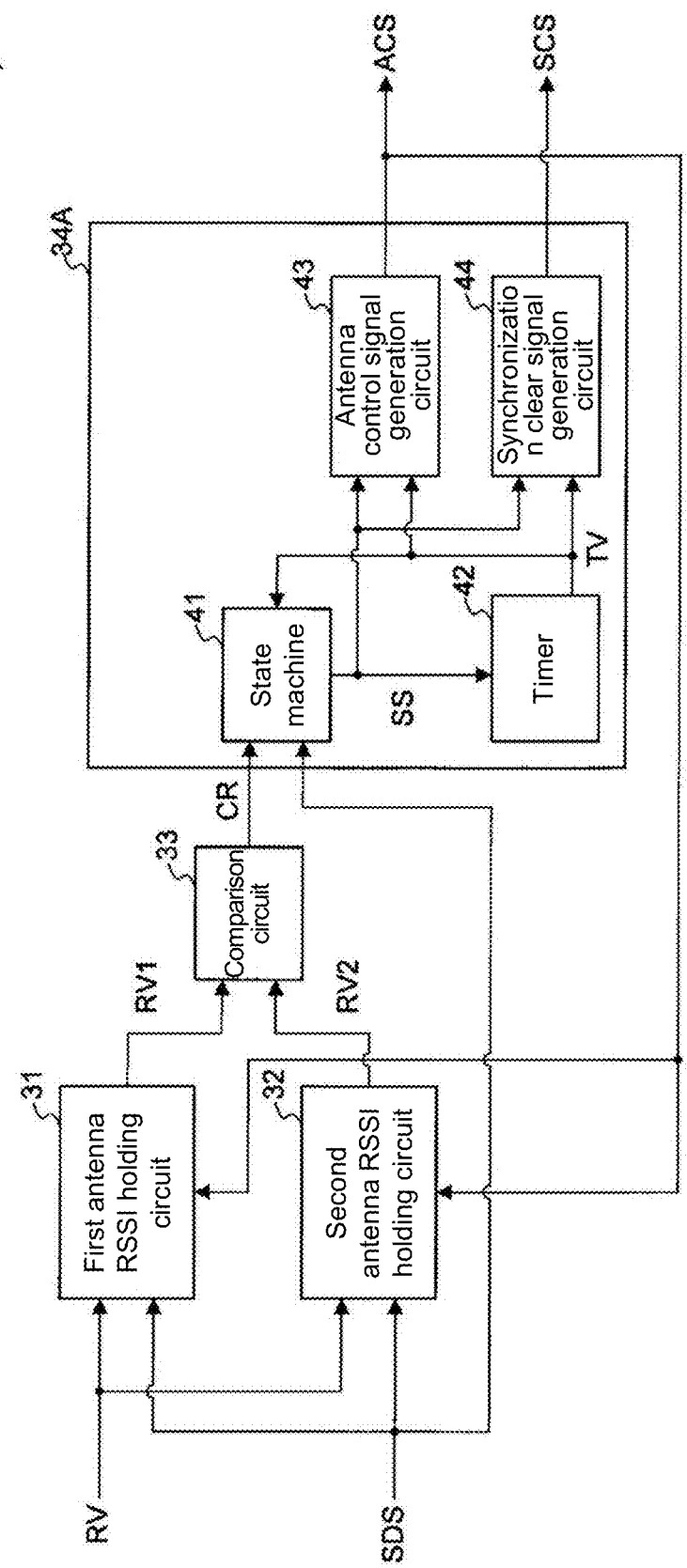
FIG. 10 is a block diagram showing the configuration of the antenna switch control circuit of a comparative example.

FIG. 10 is a block diagram showing the configuration of an antenna switch control circuit 23A of the comparative example. The antenna switch control circuit 23A differs from the antenna switch control circuit 23 of this embodiment in that the antenna switch control circuit 23A does not include the state holding signal generation circuit 45. Therefore, the state holding signal SHS is not output.

Figure 11:
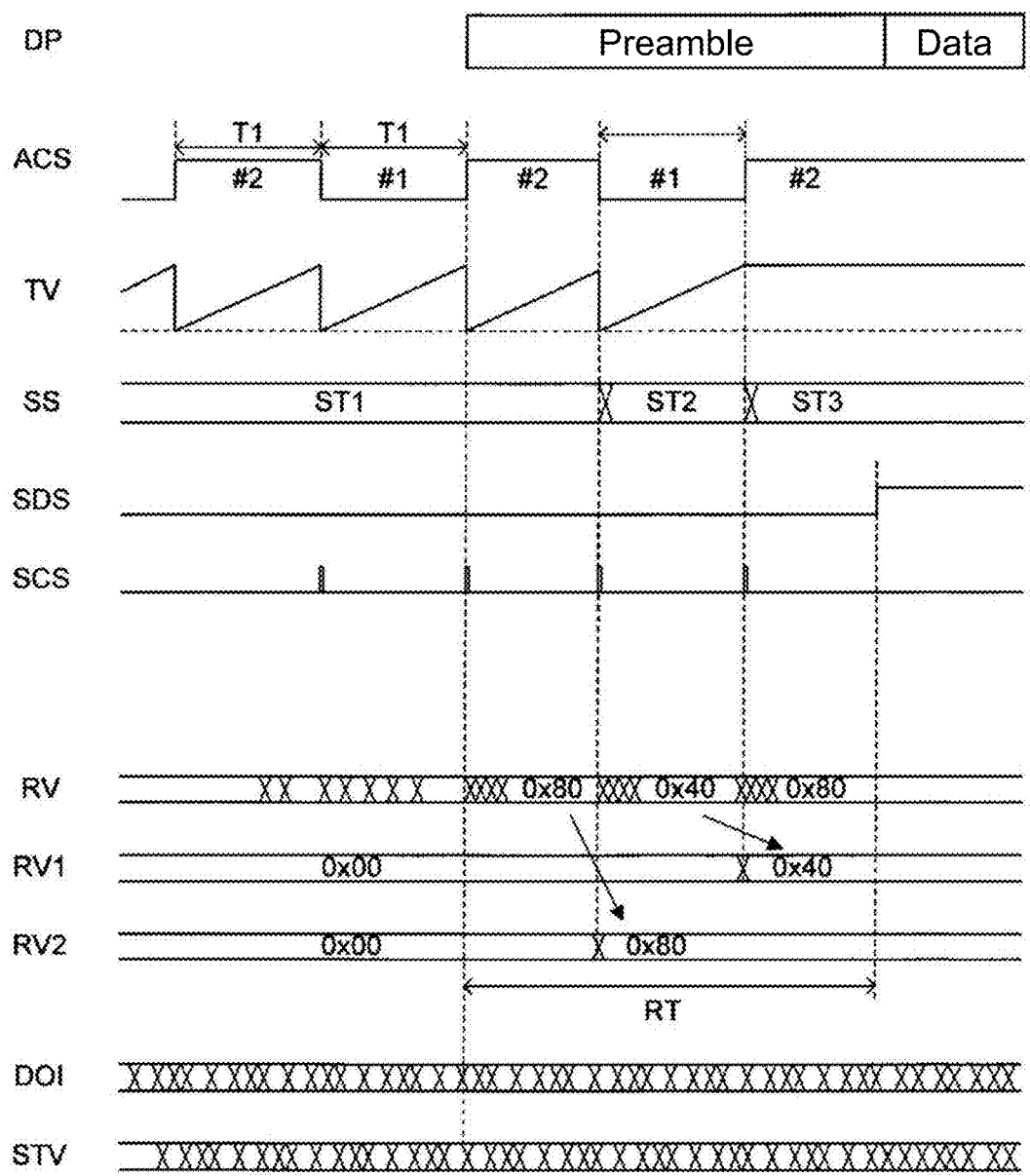
FIG. 11 is a time chart showing the receiving operation of the receiving device of a comparative example.

FIG. 11 is a time chart showing the operation of antenna diversity reception executed by the receiving device 200 of the comparative example.

During the period until the receiving device 200 receives the desired wave, the antenna switch control circuit 23A switches the signal level of the antenna control signal ACS at intervals of time T1 while the state machine 41 is in the first state ST1. Thus, a search for the desired wave is performed.

When the desired wave is input and synchronization detection is performed by the synchronization detection circuit 21, the receiving device 200 determines that the desired wave including the preamble has been received, and holds the RSSI value RV detected by the RSSI detection circuit 22 at the synchronization detection timing in the first antenna RSSI holding circuit 31 or the second antenna RSSI holding circuit 32. In the example shown in FIG. 9, synchronization detection is performed with the antenna TA2 set as the receiving antenna, and the RSSI value RV has been detected by the RSSI detection circuit 22, so the second antenna RSSI holding circuit 32 holds this as the RSSI value RV2.

The state machine 41 transitions to the second state ST2. The synchronization clear signal generation circuit 44 generates a 1-pulse synchronization clear signal SCS, and supplies the same to the synchronization detection circuit 21. Thus, the synchronization detection state is cleared (canceled) The antenna switch control circuit 23 changes the signal level of the antenna control signal ACS. In response to this, the antenna switch 11 switches the receiving antenna to the antenna TA1.

The RSSI detection circuit 22 detects the RSSI value RV based on the received signal RS input to the antenna TA1. The first antenna RSSI holding circuit 31 holds the RSSI value RV detected by the RSSI detection circuit 22 as the RSSI value RV1.

In the case where synchronization detection is performed by the synchronization detection circuit 21 or in the case where the time T1 is measured by the timer 42, the state machine 41 transitions to the third state ST3. The synchronization clear signal generation circuit 44 generates a 1-pulse synchronization clear signal SCS, and supplies the same to the synchronization detection circuit 21.

The comparison circuit 33 compares the RSSI value RV2 held by the second antenna RSSI holding circuit 32 and the RSSI value RV1 held by the first antenna RSSI holding circuit 31 with each other. Here, since the RSSI value RV2 is greater than the RSSI value RV1, the antenna switch control circuit 23 determines the antenna TA2 as the receiving antenna and controls the antenna switch 11 to switch the receiving antenna to the antenna TA2, and then holds the antenna control signal ACS.

In the receiving device 200 of the comparative example, unlike the receiving device 100 of this embodiment, the state holding signal is not supplied to the synchronization detection circuit 21. Thus, the synchronization detection state is canceled in response to the synchronization clear signal SCS at the timing when the state of the state machine 41 transitions from the first state ST1 to the second state ST2, and at the timing when transitioning from the second state ST2 to the third state ST3 (and in the case where the signal level of the antenna control signal ACS differs between the second state ST2 and the third state ST3).

Therefore, immediately after the state machine 41 transitions to the third state ST3, the receiving device 200 of the comparative example performs resynchronization with the finally determined receiving antenna, and performs the operation of receiving the data portion.

In contrast thereto, in the receiving device 100 of this embodiment, as described above, the state in which detection of DC offset, extraction of symbol timing, and synchronization detection are performed is held while the state machine 41 is in the second state ST2 and the third state ST3 until the timer 42 measures the time T1. Therefore, in the third state ST3, it is not necessary to perform resynchronization with the finally determined receiving antenna.

Therefore, in the receiving device 100 of this embodiment, the time required to determine the receiving antenna may be the initial synchronization detection period (that is, the period until the synchronization detection signal SDS becomes H level when acquiring the RSSI value RV with the antenna TA1 or TA2 in the first state ST1) plus the time T2 (that is, the time for transition from the second state ST2 to the third state ST3).

Thus, according to the receiving device 100 of this embodiment, it is possible to reduce the number (length) of preambles required for antenna diversity and to shorten the time required for transmission and reception of a data packet. Furthermore, by shortening the time required for the transmission and reception, it is possible to reduce power consumption in the communication system.

In addition, in the receiving device 100 of this embodiment, the averaging circuit 222 constituting the RSSI detection circuit 22 has a configuration as shown in FIG. 3, which makes it possible to shorten the time for the RSSI value RV to converge and to shorten the time to determine the antenna. This will be described below.

In antenna diversity, switching of the antenna, acquisition of the RSSI value, and selection of the antenna based on the acquired RSSI value are performed in the preamble section of the signal, and then the operation of receiving the data portion is performed. Here, when acquiring the RSSI value for one antenna, the RSSI value is waited to converge to a value corresponding to the received level after switching the antenna, and then the RSSI value is acquired and determined.

The averaging circuit 222 serves to suppress fluctuations in the RSSI value due to noise. Suppressing fluctuations in the RSSI value due to noise improves the accuracy of the acquired RSSI value, which ultimately leads to increased accuracy in the selection of the antenna.

Figure 12:
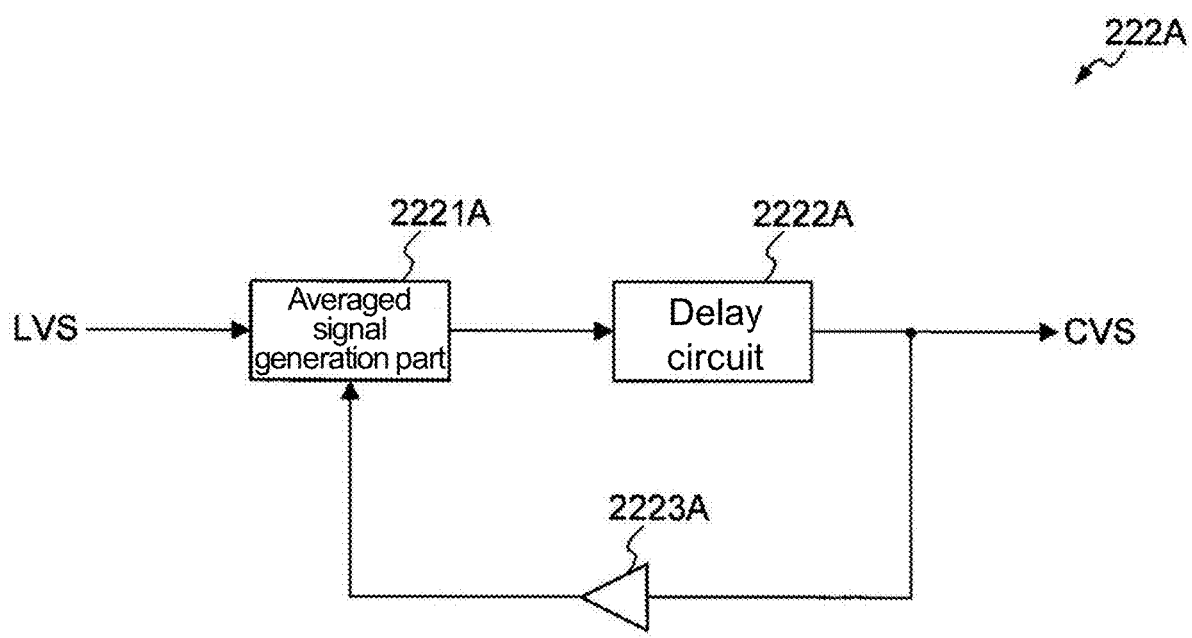
FIG. 12 is a block diagram showing the configuration of the averaging circuit of a comparative example.

FIG. 12 is a block diagram showing the configuration of an averaging circuit 222A of a comparative example which, unlike the averaging circuit 222 of this embodiment, does not have the fluctuation amount detection circuit. The averaging circuit 222A is configured by an infinite impulse response filter that includes an averaged signal generation part 2221A, a delay circuit 2222A, and a buffer 2223A.

Figure 13:
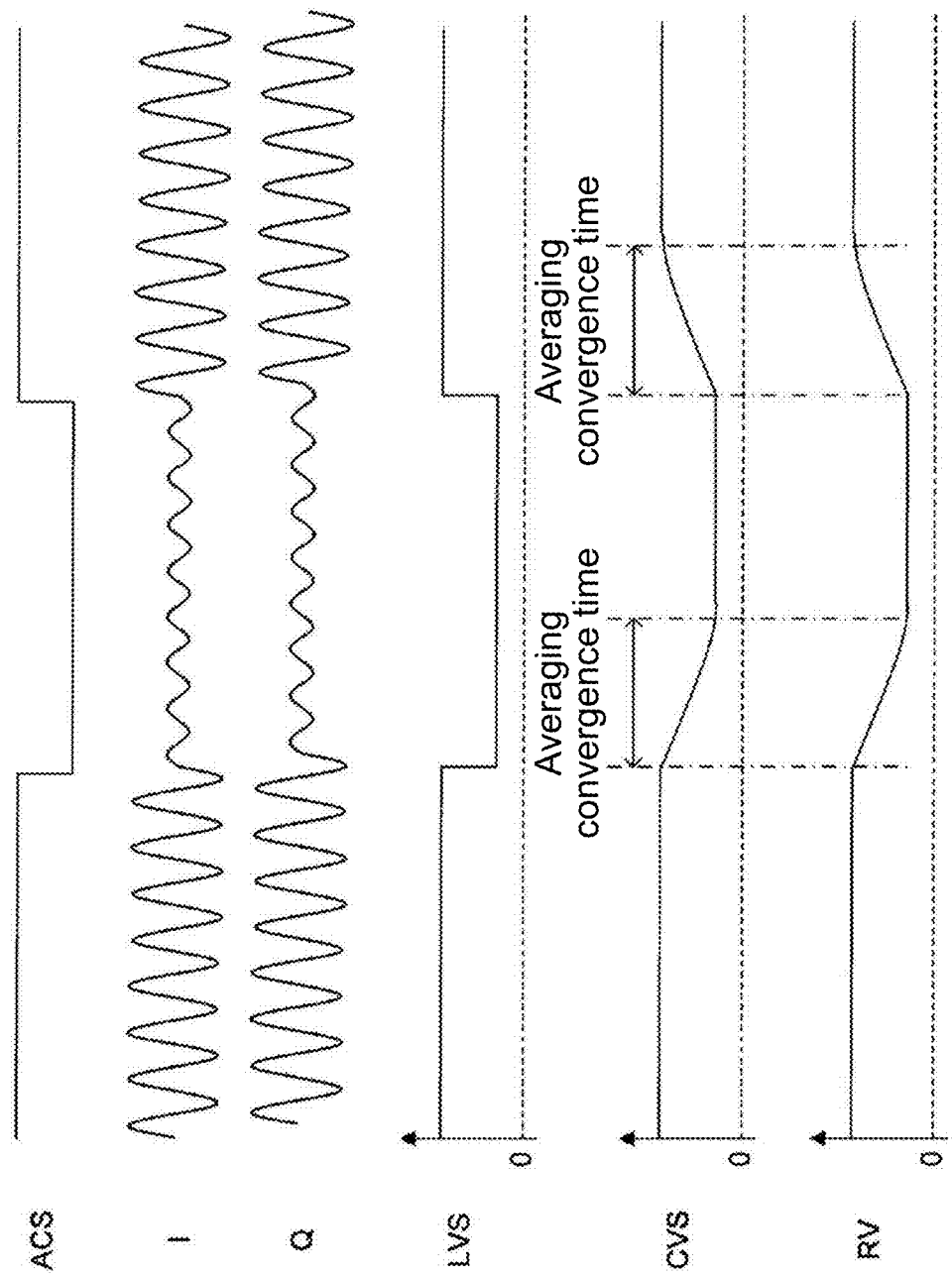
FIG. 13 is a time chart showing a change over time of the RSSI value in the RSSI detection circuit of a comparative example.

FIG. 13 is a time chart showing the changes over time of various signals and the RSSI value RV in the RSSI detection circuit having the averaging circuit 222A of the comparative example.

In the averaging circuit 222A of the comparative example, the input signal is averaged via a feedback loop (infinite impulse response filter) and output regardless of whether the fluctuation amount of the magnitude of the received signal is large. Therefore, even if the level value signal LVS changes suddenly when switching the antenna, the convergence level value signal CVS and the change in the RSSI value do not follow immediately, and the time required for the RSSI value to converge to a certain level (hereinafter referred to as the averaging convergence time) becomes longer.

The time required to determine the diversity antenna is limited by the convergence time of the RSSI value. Therefore, in the circuit of the comparative example, it takes a long time to determine the antenna. In addition, since antenna diversity reception is assumed to be performed in the preamble portion of the data packet, if the time required to determine the antenna becomes longer, a correspondingly longer preamble is required. As a result, the time required to transmit and receive data increases, and power consumption also increases.

In contrast thereto, the averaging circuit 222 of this embodiment has the fluctuation amount detection circuit 2220 as shown in FIG. 3, and in the case where the fluctuation amount of the magnitude of the received signal is equal to or greater than the threshold value TH, the signal obtained by delaying the input signal (LVS) is output directly without going through a feedback loop. Then, in the case where the fluctuation amount is less than the threshold value TH, an averaged signal is output via a feedback loop. Thus, it is possible to perform averaging by setting the starting point near the final convergence value, thereby shortening the averaging convergence time of the RSSI value RV.

Figure 14:
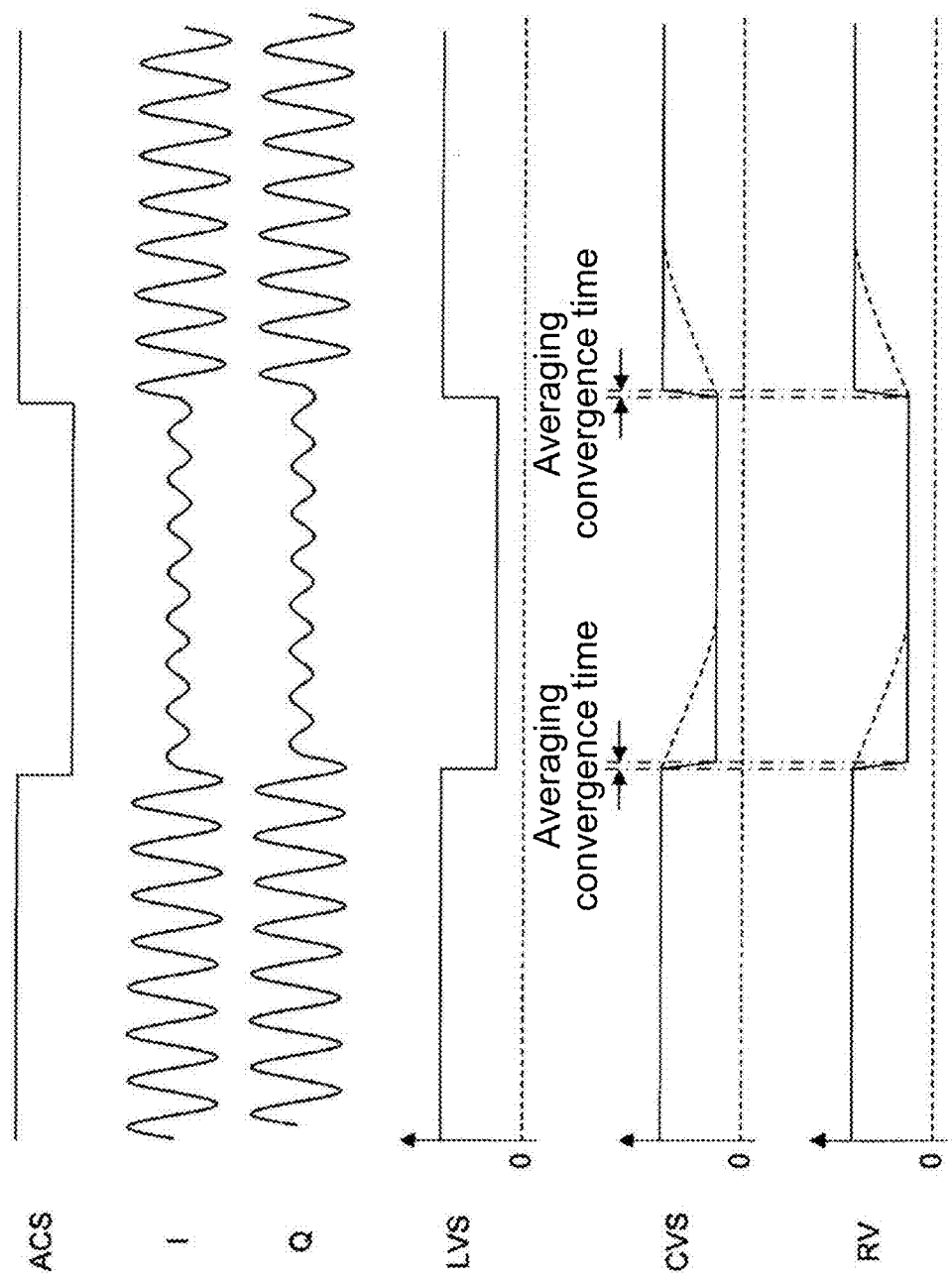
FIG. 14 is a time chart showing a change over time of the RSSI value in the RSSI detection circuit of this embodiment.

FIG. 14 is a time chart showing the changes over time of various signals and the RSSI value RV in the RSSI detection circuit 22 having the averaging circuit 222 of this embodiment. Even if the signal level of the level value signal LVS changes suddenly when switching the antenna, the convergence level value signal CVS and the RSSI value RV change sharply in response to the change. Therefore, compared to the case of the comparative example shown in FIG. 12, the averaging convergence time of the RSSI value RV can be significantly shortened.

Therefore, according to the configuration of the averaging circuit 222 of this embodiment, it is possible to shorten the convergence time of the RSSI value RV while suppressing fluctuations due to noise. Thereby, it is possible to shorten the time required to determine the receiving antenna, further reduce the number of preambles required for antenna diversity, and further shorten the time required for transmission and reception of a data packet. As a result, it becomes possible to reduce power consumption in the communication system.

Nevertheless, the disclosure is not limited to the above-described embodiments. For example, each of the above embodiments illustrates a case where the receiving device 100 includes two antennas, that is, antennas TA1 and TA2. However, the number of antennas is not limited thereto, and the configuration of the receiving device 100 of this embodiment can be applied to a case where two or more antennas are provided.

Further, the above embodiment illustrates a case where the timer 42 performs counting to measure the time T2 when the state machine 41 is in the second state ST2. However, the time measured by the timer 42 is not limited thereto, and the timer 42 may measure the same time T1 as when the state machine 41 is in the first state ST1 or the third state ST3.

Further, the above-described configuration of the averaging circuit 222 is not only a configuration that supplies the state holding signal SHS to the synchronization detection circuit 21 to maintain the synchronization state after performing the initial synchronization detection for acquiring the RSSI value, as that of the receiving device 100 of the above embodiment, but can also be applied to a receiving device that does not have such a configuration (for example, the receiving device 200 of the comparative example as shown in FIG. 9).

Furthermore, according to the averaging circuit 222 of this embodiment, it is possible to shorten the time required to achieve stable reception not only when switching the receiving antenna in antenna diversity but also in, for example, a fading environment or an environment where the surrounding radio wave conditions change dynamically.

What is claimed is:

1. A receiving device, configured to receive a radio transmission wave modulating a data packet, which comprises a preamble and a data body portion following the preamble, the receiving device comprising:

a first antenna and a second antenna;

an antenna switching part selectively switching a receiving antenna used to receive the radio transmission wave to either one of the first antenna and the second antenna;

a frequency conversion part performing frequency conversion on a received signal obtained by receiving the radio transmission wave by the first antenna or the second antenna to obtain a baseband signal;

a frequency detection part performing frequency detection on the baseband signal to obtain a frequency detection signal;

an offset removal part removing a DC offset from the frequency detection signal;

a data reproduction part performing data determination based on the frequency detection signal with the DC offset removed, and generating demodulated data;

a synchronization detection part performing synchronization detection by correlating the demodulated data with data of a predetermined preamble pattern;

a signal strength acquisition part acquiring a signal strength of the received signal based on the baseband signal; and a switching controller controlling switching of the receiving antenna performed by the antenna switching part, wherein the switching controller controls the antenna switching part to switch the receiving antenna at intervals of a first predetermined time before synchronization detection is performed by the synchronization detection part, supplies a state holding signal to the synchronization detection part to maintain a synchronization detection state, and controls the antenna switching part to switch the receiving antenna to the other antenna in a case where synchronization detection is performed by the synchronization detection part with the radio transmission wave received when one of the first antenna and the second antenna is the receiving antenna, and controls the antenna switching part to fix the receiving antenna to either one of the first antenna and the second antenna based on a comparison result obtained by comparing a first signal strength with a second signal strength after a second predetermined time has elapsed since the antenna switching part performs switching to the other antenna, wherein the first signal strength is a signal strength when the received signal is received by the first antenna, and the second signal strength is a signal strength when the received signal is received by the second antenna.

2. The receiving device according to claim 1, wherein the data reproduction part extracts a symbol timing value from the frequency detection signal with the DC offset removed, and performs data determination using the symbol timing value, and the switching controller supplies the state holding signal to the data reproduction part, and holds the symbol timing value when synchronization detection is performed by the synchronization detection part.

3. The receiving device according to claim 1, further comprising an offset detection part detecting the DC offset, wherein the switching controller supplies the state holding signal to the offset detection part, and holds a value of the DC offset when synchronization detection is performed by the synchronization detection part.

4. The receiving device according to claim 1, wherein the signal strength acquisition part calculates an RSSI value of the received signal based on I-phase and Q-phase baseband signals, and the switching controller comprises a holding part that holds the RSSI value when the received signal is received by the first antenna and the RSSI value when the received signal is received by the second antenna, and controls the antenna switching part based on a comparison result obtained by comparing the RSSI values.

5. The receiving device according to claim 1, wherein the radio transmission wave is a modulated wave obtained by modulating the data packet by an FSK modulation method, and the frequency detection part obtains the frequency detection signal by converting a frequency change included in the baseband signal into an amplitude change.

6. The receiving device according to claim 2, wherein the radio transmission wave is a modulated wave obtained by modulating the data packet by an FSK modulation method, and the frequency detection part obtains the frequency detection signal by converting a frequency change included in the baseband signal into an amplitude change.

7. The receiving device according to claim 3, wherein the radio transmission wave is a modulated wave obtained by modulating the data packet by an FSK modulation method, and the frequency detection part obtains the frequency detection signal by converting a frequency change included in the baseband signal into an amplitude change.

8. The receiving device according to claim 4, wherein the radio transmission wave is a modulated wave obtained by modulating the data packet by an FSK modulation method, and the frequency detection part obtains the frequency detection signal by converting a frequency change included in the baseband signal into an amplitude change.

9. The receiving device according to claim 4, wherein the signal strength acquisition part comprises:

a signal level calculation part generating a level value signal representing a magnitude of the received signal based on the I-phase and Q-phase baseband signals;

an averaging circuit generating the level value signal and an averaged signal obtained by averaging the level value signal; and a fluctuation amount detection part detecting a fluctuation amount of the level value signal, and calculates the RSSI value based on the level value signal in a case where the fluctuation amount of the level value signal is equal to or greater than a threshold value, and calculates the RSSI value based on the averaged signal in a case where the fluctuation amount of the level value signal is less than the threshold value.

10. The receiving device according to claim 6, wherein the signal strength acquisition part comprises a logarithmic conversion circuit that performs logarithmic conversion of a signal level, calculates the RSSI value by logarithmically converting a signal level of a signal obtained by delaying the level value signal in a case where the fluctuation amount of the level value signal is equal to or greater than the threshold value, and calculates the RSSI value by logarithmically converting a signal level of a signal obtained by delaying the averaged signal in a case where the fluctuation amount of the level value signal is less than the threshold value.

\* \* \* \* \*